United States Patent
Alanazi et al.

(10) Patent No.: US 12,481,253 B2
(45) Date of Patent: Nov. 25, 2025

(54) METHOD AND SYSTEM FOR DETERMINING STEAM TRAP DATA USING MACHINE LEARNING

(71) Applicant: SAUDI ARABIAN OIL COMPANY, Dhahran (SA)

(72) Inventors: Mohammed K. Alanazi, Dhahran (SA); Talal A. Altook, Khobar (SA); Abdulaziz M. Alnutaifi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1050 days.

(21) Appl. No.: 17/454,590

(22) Filed: Nov. 11, 2021

(65) Prior Publication Data

US 2023/0147522 A1 May 11, 2023

(51) Int. Cl.
*G05B 13/02* (2006.01)
*F01K 1/16* (2006.01)
(Continued)

(52) U.S. Cl.
CPC .......... *G05B 13/0265* (2013.01); *F01K 1/16* (2013.01); *F01K 1/20* (2013.01); *G06T 7/0004* (2013.01); *G06T 7/10* (2017.01)

(58) Field of Classification Search
CPC ......... G05B 13/0265; F01K 1/16; F01K 1/20; F01K 13/02; G06T 7/0004; G06T 7/10;
(Continued)

(56) References Cited

U.S. PATENT DOCUMENTS 6,644,131 B2 11/2003 Rebik
7,902,507 B1 3/2011 Garvey et al.
(Continued)

FOREIGN PATENT DOCUMENTS

| | | |
|---|---|---|
| CN | 105142408 B | 6/2019 |
| DE | 4323048 A1 | 2/1994 |
| JP | 6676077 B2 | 4/2020 |

OTHER PUBLICATIONS

"Steam Manual Steam Traps & Energy Traps Intelligent Trap Valve Stations", bitherm Sistemas, Jan. 2018 (116 pages).
(Continued)

*Primary Examiner* — Jennifer Mehmood
*Assistant Examiner* — Vaisali Rao Koppolu
(74) *Attorney, Agent, or Firm* — Osha Bergman Watanabe & Burton LLP

(57) ABSTRACT

A method may include obtaining, from a camera device, thermal image data for a steam area of a plant facility. The steam area may include a steam trap for a steam network. The method may further include obtaining plant steam data regarding the steam trap. The method may further include determining pixel data regarding the steam trap using the thermal image data and an image segmentation process. The method further includes determining various temperature values across the steam trap using the pixel data. The method may further include determining predicted steam trap data using the temperature values, the plant steam data, and a machine-learning model. The method may further include transmitting a command that adjusts one or more parameters of the steam network based on the predicted steam trap data.

19 Claims, 6 Drawing Sheets

(51) Int. Cl.
*F01K 1/20* (2006.01)
*G06T 7/00* (2017.01)
*G06T 7/10* (2017.01)

(58) Field of Classification Search
CPC . G06T 2207/20084; G06T 2207/30164; F16T 1/48
See application file for complete search history.

(56) References Cited

U.S. PATENT DOCUMENTS

| | | | |
|---|---|---|---|
| 8,608,249 B2 | 12/2013 | Vinegar et al. | |
| 8,715,980 B2 | 5/2014 | Clarke | |
| 8,798,798 B2* | 8/2014 | Ecock | F24D 10/00 |
| | | | 700/282 |
| 10,282,676 B2 | 5/2019 | Nixon et al. | |
| 10,410,113 B2 | 9/2019 | Clayton et al. | |
| 10,430,725 B2 | 10/2019 | Anderson et al. | |
| 10,927,655 B2 | 2/2021 | Swist | |
| 2008/0270047 A1* | 10/2008 | Quake | F16T 1/48 |
| | | | 702/50 |
| 2014/0002639 A1 | 1/2014 | Cheben et al. | |
| 2016/0045841 A1 | 2/2016 | Kaplan et al. | |
| 2018/0347406 A1 | 12/2018 | Friesth | |
| 2020/0019877 A1* | 1/2020 | Okanohara | G06N 3/044 |
| 2021/0011443 A1 | 1/2021 | Mcnamara et al. | |
| 2021/0116322 A1* | 4/2021 | Klanderud | F16T 1/48 |
| 2021/0191365 A1 | 6/2021 | Kadam et al. | |
| 2021/0215645 A1* | 7/2021 | Owens | F17D 1/06 |
| 2024/0310217 A1* | 9/2024 | Smiechowicz | G01K 7/22 |

OTHER PUBLICATIONS

"Yarway Steam Traps The Industrial Steam Trapping Handbook", Emerson, 2017 (100 pages).

* cited by examiner

METHOD AND SYSTEM FOR DETERMINING STEAM TRAP DATA USING MACHINE LEARNING

BACKGROUND

Steam is used in various applications in many plant facilities, such as heating operations and power generation operations. In particular, steam may be sent throughout a plant over a steam network from various boilers, where the steam becomes condensate that is returned to the boilers over a return network. The steam network may include multiple steam traps for removing condensate from the steam network, while having the steam network continue to perform various steam operations. However, like all mechanical devices, a steam trap may break or become dirty over time, causing the steam trap to malfunction.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor and from a camera device, thermal image data for a steam area of a plant facility. The steam area includes a steam trap for a steam network. The method further includes obtaining, by the computer processor, plant steam data regarding the steam trap. The method further includes determining, by the computer processor, pixel data regarding the steam trap using the thermal image data and an image segmentation process. The method further includes determining, by the computer processor, various temperature values across the steam trap using the pixel data. The method further includes determining, by the computer processor, predicted steam trap data using the temperature values, the plant steam data, and a machine-learning model. The method further includes transmitting, by the computer processor, a command that adjusts one or more parameters of the steam network based on the predicted steam trap data.

In general, in one aspect, embodiments relate to a system that includes a steam generator, a steam header coupled to the steam generator, and a stream trap that includes an inlet and an outlet. The inlet of the steam trap is coupled to the steam header. The system further includes a camera device disposed in a steam area that includes the steam trap. The system further includes a steam trap manager coupled to the camera device. The steam trap manager includes a computer processor and a machine-learning model. The steam trap manager determines various temperature values across the steam trap using thermal image data from the camera device. The steam trap manager determines predicted steam trap data using the machine-learning model, plant steam data, and the temperature values.

In general, in one aspect, embodiments relate to a non-transitory computer readable medium storing instructions executable by a computer processor. The instructions obtain, from a camera device, thermal image data for a steam area of a plant facility. The steam area includes a steam trap for a steam network. The instructions obtain plant steam data regarding the steam trap. The instructions determine pixel data regarding the steam trap using the thermal image data. The instructions determine various temperature values across the steam trap using the pixel data. The instructions determine predicted steam trap data using the temperature values, the plant steam data, and a machine-learning model. The instructions transmit a command that adjusts one or more parameters of the steam network based on the predicted steam trap data.

In some embodiments, a steam trap state is determined among various steam trap states of the steam trap using a machine-learning model. A command may implement a maintenance operation based on the steam trap state. In some embodiments, various steam trap states include a first state, a second state, and a third state, where the first state corresponds to the steam trap allowing condensate to pass through the steam trap while trapping a predetermined amount of steam at an inlet of the steam trap. The second state may correspond to the steam trap allowing a portion of the predetermined amount of steam to pass through the steam trap. The third state may correspond to the steam trap having no condensate being able to pass through the steam trap. In some embodiments, predicted steam trap data is determined for various steam traps using the machine-learning model. An expected failure date of the steam trap may be determined among various steam traps using the predicted steam trap data. In some embodiments, predicted steam trap data is determined regarding a second steam trap using the machine-learning model. A determination may be made whether a steam trap fails based on the predicted steam trap data. In some embodiments, the steam trap includes an inlet and an outlet, where the inlet is coupled to a steam header that is coupled to a steam generator, and the outlet is coupled to a condensate return network that is coupled to the steam generator. In some embodiments, pixel data is a segmented object within one or more thermal images of the steam trap. In some embodiments, a machine-learning model is an artificial neural network that includes various hidden layers and at least one activation function, where a respective hidden layer among the hidden layers includes at least one neuron. The artificial neural network may be trained using a backpropagation algorithm. In some embodiments, the plant steam data includes inlet pressure data, outlet temperature data, flow rate data, or inlet temperature data. In some embodiments, a steam trap is a passive steam trap, a steam energy trap, or an intelligent steam trap. In some embodiments, a condensate return network is coupled to the outlet of the steam trap, where the steam generator is a boiler and predicted steam trap data describes a flow of condensate to the condensate return network from the steam trap.

In light of the structure and functions described above, embodiments of the invention may include respective means adapted to carry out various steps and functions defined above in accordance with one or more aspects and any one of the embodiments of one or more aspect described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
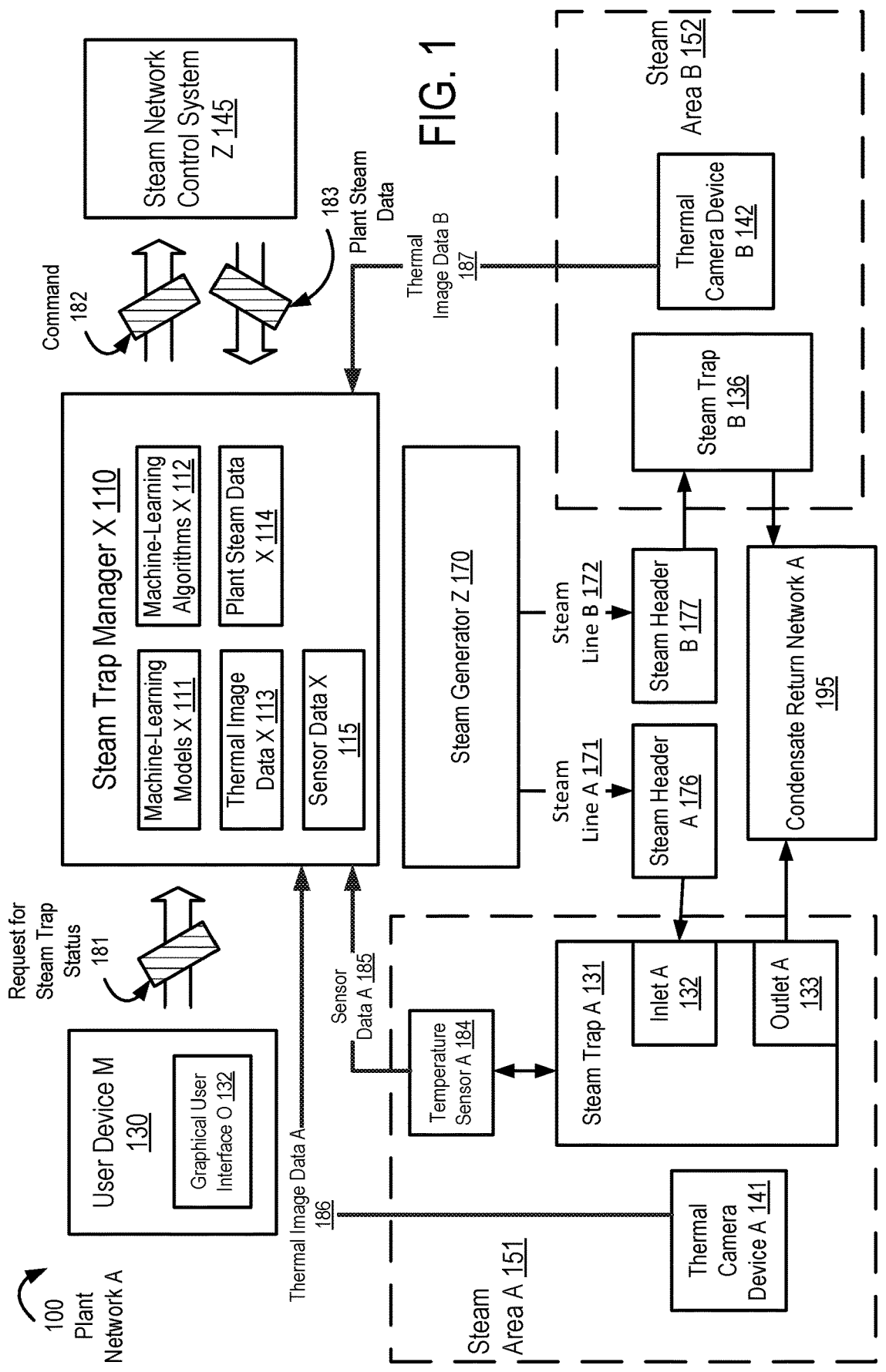
FIGS. 1 and 2 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for determining predicted steam trap data regarding one or more steam traps throughout a plant facility. Examples of predicted steam trap data may include the health of a respective steam trap (e.g., whether the steam trap is operating satisfactorily, is partially blocked, or is completely blocked) or an expected failure date of a particular steam trap. In some embodiments, a steam trap manager is used to provide an analytics-driven solution that utilizes image analytics and applies machine-learning techniques to classify steam trap conditions. For example, a steam trap manager may be a server or other computer device connected to a plant network that collects thermal images from various camera devices situated in steam areas near steam traps. From these thermal images, a steam trap manager may determine temperature changes inside a steam trap during a particular operation without any invasive physical intervention into the equipment. Using other plant steam data around the plant network (e.g., temperature sensor data, flow rate data, and pressure data), a machine-learning model may predict steam trap data accordingly.

Furthermore, some embodiments may ease process equipment monitoring around a plant facility by reducing the time required to inspect steam traps and providing steam trap updates in real-time. Likewise, some embodiments may also minimize plant losses from malfunctioning steam equipment through early detection and identifying of early failure conditions through an autonomous workflow. Therefore, some embodiments may detect and minimize steam losses through anticipating failing steam traps. Rather than relying on inconsistent results based on human inspections, machine learning may provide an objective and reliable indicator of changing plant conditions for use in managing maintenance operations.

Turning to FIG. 1, FIG. 1 shows a schematic diagram in accordance with one or more embodiments. As shown in FIG. 1, a plant network (e.g., plant network A (100)) may operate within a plant facility and include one or more steam network control systems (e.g., steam network control system Z (145)), one or more steam traps (e.g., steam trap A (131), steam trap B (136)), one or more thermal camera devices (e.g., thermal camera A (141), thermal camera device B (142)), one or more user devices (e.g., user device M (130)), one or more steam generators (e.g., steam generator Z (170)), and one or more condensate return networks (e.g., condensate return network A (195)). Plant facilities may include a gas-oil separation plant (GOSP), a refinery, a petrochemical processing plant, or an electric power plant. However, other types of plants facilities are also contemplated outside the oil and gas industry.

Turning to a plant network, a plant network may be a computer network that includes various electronic network elements, such as switches, routers, and other devices for establishing one or more electrical connections. Furthermore, the plant network may also include one or more mechanical circuits, such as mechanical conduits for transporting steam and/or condensate to various plant devices, such as heat exchangers, heating radiators, piping for product lines, moving turbines, storage tanks, etc. A steam generator may include hardware for generating steam, such as one or more boilers that convert chemical energy from fuel into heat energy that evaporates water. For example, a steam generator may be connected to steam equipment using two lines: a steam distribution line that operates at a high energy level and a condensate return line.

The plant network may also include one or more steam distribution systems that include hardware, such as various piping systems (e.g., steam line A (171), steam line B (172), steam header A (176), steam header B (177), a steam manifold, etc.) to transport steam and/or other forms of water throughout the plant network. For example, a plant network may include one or more closed pipe circuits where water changes to steam then back to water again, thereby repeating this cycle without losing water mass. Likewise, the plant network may also include one or more open pipe circuits where condensate produced from steam is not sent back to a steam generator, but instead evacuated outside a plant facility. Furthermore, a steam distribution system may also include one or more steam headers (e.g., steam header A (176), steam header B (177)). For example, steam may exit a steam generator through piping referred to as a steam header. Thus, steam headers may serve as a reservoir that feed steam to individual heating circuits or other steam application circuits. As such, steam headers may be large enough to reduce pressure drops between the steam generator and the beginning of a steam application circuit. In contrast, steam pipes that are undersized may cause high pressure drops resulting in steam starvation at the point of usage.

Moreover, different types of steam may be used in various applications and processes within a plant facility. For example, dry saturated steam may include steam at a boiling temperature without any water particles in liquid form in the steam. Steam may be changed into water (i.e., condensate) during a condensation process that is the inverse process of vaporization. During a revaporization process, vapor may be formed as a result of a drop in pressure or the expansion of condensate. Thus, revaporized steam may also be referred to as "expansion steam" or "flash steam."

Keeping with FIG. 1, a plant network may include one or more steam traps. For example, a steam trap may include hardware that acts as a draining element within a steam system. As such, a steam trap may cause an abrupt change in pressure from an inlet (e.g., inlet A (132)) to an outlet (e.g., outlet A (133)), while maintaining the steam's energetic content. In particular, a mixture of condensate and steam may be provided at a steam trap's inlet, where the steam trap removes the condensate that is passed through the outlet, such as to a condensate return line. Likewise, the removed condensate may be partially revaporized within the steam trap in order to reach an energy balance, e.g., based on the expansion of the condensate through the steam trap since no external heat may be provided. Different types of steam traps may be used, such as a passive stream trap, a steam energy trap, and an intelligent steam trap. After condensate passes through a steam trap, a condensate may be transported over a condensate return network (e.g., condensate return network A (195)) using various return lines. For example, the condensate may be returned to one or more steam generators for use in producing more steam for various steam applications.

Keeping with steam traps, a passive steam trap may include various types of steam traps, such as cyclic and continuous steam traps, orifice plate steam traps, float traps, inverted bucket traps, thermodynamic steam traps, thermostatic steam traps, and mechanical steam traps. For thermodynamic steam traps, a thermodynamic steam trap may use the dynamic effect of flash steam with a disc above a seat inside a control chamber or cap to implement a steam trap. Incoming pressure in the thermodynamic steam trap may raise the disc, and cool condensate plus air may be immediately discharged from an inner ring under the disc, and out through various peripheral outlets. Afterwards, hot condensate flowing through an inlet into the chamber under the disc may drop in pressure and release flash steam moving at a high velocity into the thermodynamic steam trap. This high velocity may produce a low pressure area drawing the disc towards its seat. Likewise, flash steam pressure may builds up inside an upper chamber forcing the disc down thereby closing a chamber. At this point, the flash steam may become trapped in the upper chamber, producing a situation where the top of the disc is subject to greater force than the disk's underside. The trapped pressure in the upper chamber may eventually fall as the flash steam condenses, thereby raising the disk and releasing the condensate from the steam trap.

For thermostatic steam traps, a thermostatic steam trap may a steam trap that operates in response to the surrounding steam temperature. Thus, temperature in a thermostatic steam trap may be adjusted, such as using an external adjustment mechanism. Examples of thermostatic steam traps may include liquid expansion traps, bimetallic steam traps, and balanced pressure steam trap. A liquid expansion trap may include an oil filled element that expands when heated for closing a trap valve. A bimetallic steam trap may include two strips of dissimilar metals welded together into one element, where trap operation occurs at a certain fixed temperature range. A balanced pressure steam trap may include a capsule that contains a liquid and water mixture with a boiling point below that of water. In cold conditions, the capsule may be relaxed (i.e., the valve is off its seat and wide open allowing unrestricted removal of air). During operation, liquid in the balanced pressure steam trap may vaporize before steam reaches the trap, causing the liquid to expand and shut a valve. Afterwards, vapor may condense causing the valve to open by the capsule contracting, thereby releasing condensate until steam approaches again.

For mechanical steam traps, a mechanical steam trap may operate based on the difference in density between steam and condensate. Examples of mechanical steam traps may include ball float steam traps and inverted bucket steam traps. In particular, a mechanical steam trap may include an automatic air vent that uses the same balanced pressure capsule element as some thermostatic steam traps, where the capsule may be located in a steam space above the condensate level. After releasing the initial air, the mechanical steam trap may remain closed until air or other non-condensable gases accumulate during normal running and cause the trap to open by reducing the temperature of the air/steam mixture.

For steam energy traps, a steam energy trap may include a thermostat and an automatic valve that is driven by the energetic level of the fluid. Examples of steam energy traps may include liquid expansion thermostatic energy traps, bimetallic thermostatic energy traps, bimetallic bi-thermostatic energy traps, and a trap valve station. For intelligent steam traps, an intelligent steam trap may be similar to a steam energy trap with a computer processor, a display device that includes a graphical user interface, and various monitoring circuitry. For example, an intelligent steam trap may include two sensors (e.g., an ultrasound sensor and a temperature sensor) that generate sensor data for monitoring one or more working points of the respective energy trap. Thus, an intelligent steam trap may identify the emergence of internal or external steam leakage, obstruction or blockage, inappropriate temperature, or low energy efficiency in the device.

In some embodiments, a plant network includes a steam trap manager (e.g., steam trap manager X (110)) that includes hardware and/or software with functionality for monitoring one or more steam traps in the plant network. In particular, the steam trap manager may be a server or a control system coupled to one or more camera devices (e.g., thermal camera device A (141), thermal camera device B (142)) disposed in one or more steam areas (e.g., steam area A (151), steam area B (152)). In some embodiments, for example, a camera device may include hardware for generating thermal image data (e.g., thermal image data A (186), thermal image data B (187), thermal image data X (113)) of a respective steam trap in a respective steam area (e.g., steam trap A (131) in steam area A (151), steam trap B (136) in steam area B (152)). Thus, a steam trap manager may capture thermal images for different steam areas using camera devices at different imaging angles, camera distances, and camera settings. Moreover, thermal data may include be a heat image of a portion or all of a steam trap that identifies one or more temperature values within different chambers, passages, or components within a steam trap. Likewise, a steam trap manager may also be coupled to one or more temperature sensors (e.g., temperature sensor A (184) transmits sensor data A (185) to steam trap manager X (110)), one or more flow rate sensors, and one or more pressure sensors throughout the plant network, e.g., to collect data for analyzing various steam traps. Thus, a steam trap manager may collect sensor data (e.g., sensor data X (115)) over a plant network.

Furthermore, a steam trap manager may include functionality for determining a state of a steam trap using one or more machine-learning models. For example, a steam trap manager may use various machine-learning techniques to classify the status of a particular steam trap by deducing physical phenomena using various temperature values and other data. In other words, machine learning may be used to perform early detection and identify steam trap conditions through an analytical and autonomous method of analysis. The thermal image data of steam traps may be used as an input to detect a temperature gradient across an analyzed area of interest in a steam trap for classifying its condition.

In some embodiments, a steam trap may be classified according to one or more states. Examples of steam trap states may include a healthy state, i.e., where a trap's inlet is at a high temperature since steam is trapped at the inlet while the trap's outlet is condensate at a cold temperature. In a healthy state, a steam trap may allow condensate to pass through while trapping the steam at the inlet. Another state of a steam trap may correspond to a passing state, where the trap's inlet and outlet temperatures are both high and close in value. In a passing state, a steam trap may continue to blow steam through the trap indicating the trap is functioning at some level. Another state of a steam trap may correspond to a blocked state, where the trap's inlet and outlet temperatures are both low and close in value. In a blocked state, a steam trap may have no condensate passing through the trap indicating failed position (i.e., closed position) of the steam trap. Rather than use a human inspection operator to physically inspect thousands of steam traps at a plant site, the steam trap manager may automatically determine steam trap states in real time based on thermal image data and/or other plant steam data (e.g., plant steam data X (114), plant steam data (183)). In some embodiments, a steam trap manager may continuously monitor various steam traps, e.g., for determining whether to perform regular maintenance.

In some embodiments, a steam trap manager includes hardware and/or software with functionality for generating and/or updating one or more machine-learning models (e.g., machine-learning models X (111)). For example, different types of machine-learning models may be trained, such as convolutional neural networks, deep neural networks, recurrent neural networks, support vector machines, decision trees, inductive learning models, deductive learning models, supervised learning models, unsupervised learning models, reinforcement learning models, etc. In a deep neural network, for example, a layer of neurons may be trained on a predetermined list of features based on the previous network layer's output. Thus, as data progresses through the deep neural network, more complex features may be identified within the data by neurons in later layers. Likewise, a U-net model or other type of convolutional neural network model may include various convolutional layers, pooling layers, fully connected layers, and/or normalization layers to produce a particular type of output. Thus, convolution and pooling functions may be the activation functions within a convolutional neural network.

In some embodiments, two or more different types of machine-learning models are integrated into a single machine-learning architecture, e.g., a machine-learning model may include support vector machines and neural networks. In some embodiments, the steam trap manager may generate augmented data or synthetic data to produce a large amount of interpreted data for training a particular model. Likewise, a steam trap manager may obtain a variety of image data and physical site data for validating the actual states of steam traps.

In some embodiments, various types of machine learning algorithms (e.g., machine-learning algorithms X (112)) may be used to train the model, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model (e.g., one of machine-learning models X (111)).

With respect to artificial neural networks, for example, an artificial neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the artificial neural network. Likewise, these weighted data inputs may be summed such that this sum is communicated through a neuron's activation function to other hidden layers within the artificial neural network. As such, the activation function may determine whether and to what extent an output of a neuron progresses to other neurons where the output may be weighted again for use as an input to the next hidden layer.

Turning to recurrent neural networks, a recurrent neural network (RNN) may perform a particular task repeatedly for multiple data elements in an input sequence (e.g., a sequence of temperature values from an inlet to an outlet), with the output of the recurrent neural network being dependent on past computations. As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm such as a backpropagation algorithm may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used to train various deep neural networks. In some embodiments, a recurrent neural network is trained using a reinforcement learning algorithm such as a deep reinforcement learning algorithm. For more information on reinforcement learning algorithms, see the discussion below.

Embodiments are contemplated with different types of RNNs. For example, classic RNNs, long short-term memory (LSTM) networks, a gated recurrent unit (GRU), a stacked LSTM that includes multiple hidden LSTM layers (i.e., each LSTM layer includes multiple RNN cells), recurrent neural networks with attention (i.e., the machine-learning model may focus attention on specific elements in an input sequence), bidirectional recurrent neural networks (e.g., a machine-learning model that may be trained in both time directions simultaneously, with separate hidden layers, such as forward layers and backward layers), as well as multidimensional LSTM networks, graph recurrent neural networks, grid recurrent neural networks, etc. With regard to LSTM networks, an LSTM cell may include various output lines that carry vectors of information, e.g., from the output of one LSTM cell to the input of another LSTM cell. Thus, an LSTM cell may include multiple hidden layers as well as various pointwise operation units that perform computations such as vector addition.

In some embodiments, a steam trap manager uses one or more ensemble learning methods in connection to the machine-learning models. For example, an ensemble learning method may use multiple types of machine-learning models to obtain better predictive performance than available with a single machine-learning model. In some embodiments, for example, an ensemble architecture may combine multiple base models to produce a single machine-learning model. One example of an ensemble learning method is a BAGGing model (i.e., BAGGing refers to a model that performs Bootstrapping and Aggregation operations) that combines predictions from multiple neural networks to add a bias that reduces variance of a single trained neural network model. Another ensemble learning method includes a stacking method, which may involve fitting many different model types on the same data and using another machine-learning model to combine various predictions.

With respect to control systems, a control system (e.g., steam network control system Z (145)) may include hardware and/or software that monitors and/or operates plant devices, such as steam equipment for operating a steam network and/or a condensate return network. In some embodiments, a steam trap manager is a control system for a plant network. Control systems may transmit various commands (e.g., command (182)) to monitor steam traps and/or manage maintenance operations. A command may be a network message that is transmitted over a machine-to-machine network protocol, or a control signal received by plant equipment for adjusting various parameters in a steam system or for automatically triggering one or more operations. Parameters may include operating temperature, operating pressures, steam volumes and flow rates, and other parameters for performing various steam operations.

Furthermore, a control system may be coupled to facility equipment and sensors to collect data throughout a facility in order to implement one or more process-control schemes. For example, process-control schemes may include feedback schemes, feed-forward schemes, backpressure schemes, ratio schemes, cascade schemes, and/or differential schemes. Likewise, control systems may use various types of controllers, such as programmable logic controllers (PLCs), self-contained controllers, proportional and integral (PI) controllers, and proportional, integral, and derivative (PID) controllers. Facility equipment may include various hardware components, such as heat exchangers, pumps, valves, compressors, and storage tanks among various other types of hardware components. Examples of sensors may include pressure sensors, temperature sensors, torque sensors, rotary switches, weight sensors, position sensors, microswitches, hydrophones, accelerometers, etc. In some embodiments, a control system may include a programmable logic controller that may control valve states, fluid levels, pipe pressures, warning alarms, pressure releases and/or various hardware components throughout a facility. Thus, a programmable logic controller may be a ruggedized computer system with functionality to withstand vibrations, extreme temperatures, wet conditions, and/or dusty conditions, such as those around a refinery or drilling rig.

In some embodiments, a control system includes a distributed control system (DCS). A distributed control system may be a computer system for managing various processes at a facility using multiple control loops. As such, a distributed control system may include various autonomous controllers (such as remote terminal units) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. With respect to an RTU, an RTU may include hardware and/or software, such as a microprocessor, that connects sensors and/or actuators using network connections to perform various processes in the automation system.

Furthermore, a user device (e.g., user device M (130)) may communicate with a steam trap manager regarding the status of one or more steam traps. For example a user may input a user selection of one or more steam traps in a graphical user interface (e.g., graphical user interface O (132)) to transmit a request for steam trap data (e.g., request for steam trap status (181)). Likewise, the steam trap manager may automatically transmit notifications to user devices in response to one or more steam traps entering a blocked state or determined an expected failure date for a respective steam trap. User devices (e.g., user device M (130)) may include personal computer, smartphones, tablets, human machine interfaces (HMIs), and/or other types of computer devices. A control system, a steam trap manager, a user device, and/or a thermal camera device may include a computer system similar to the computer system (502) described below in FIG. 5 and the accompanying description.

Figure 2:
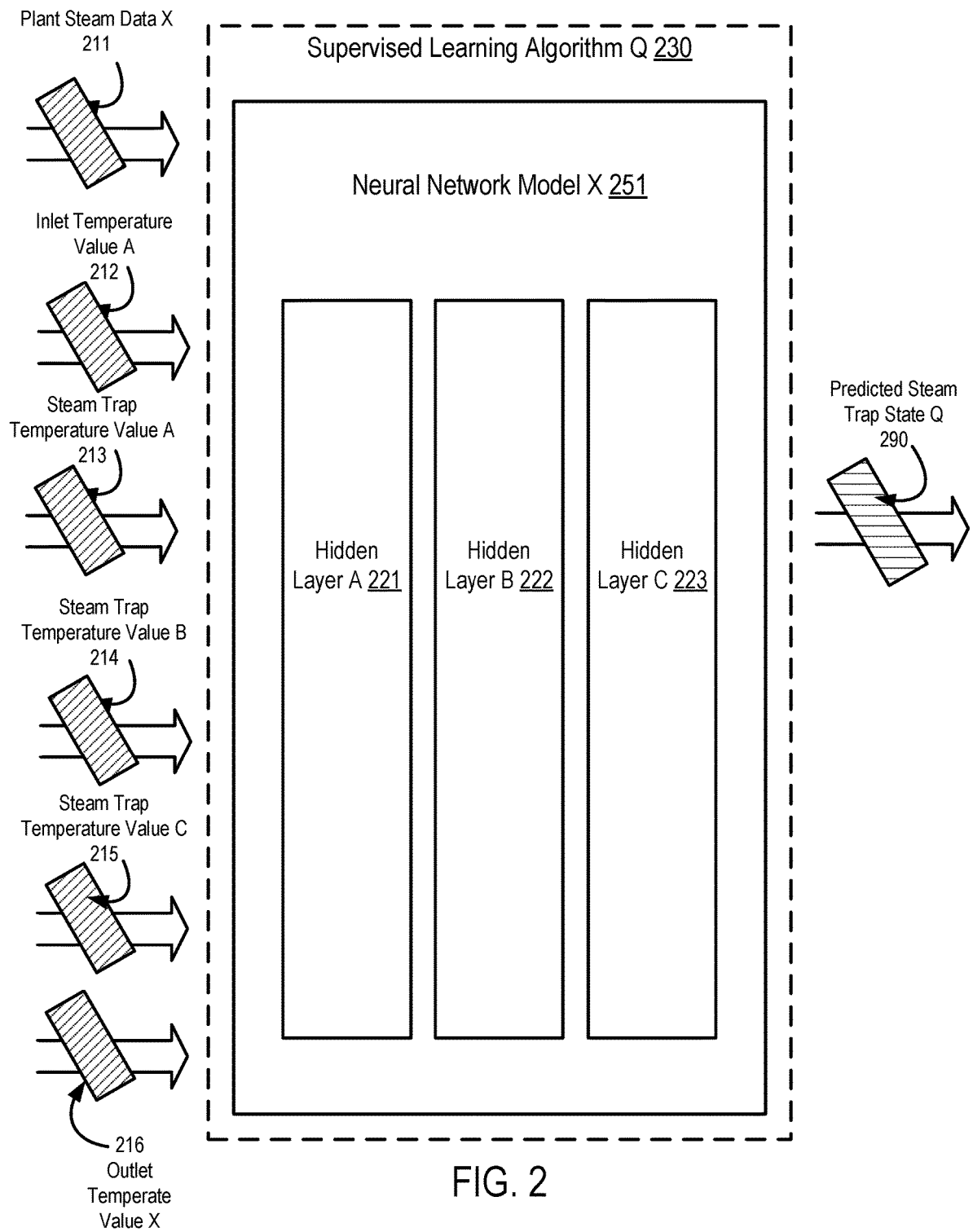

Turning to FIG. 2, FIG. 2 provides a schematic diagram in accordance with one or more embodiments. In FIG. 2, a neural network model X (250) is trained using a machine-learning algorithm, i.e., supervised learning algorithm Q (230). In particular, the neural network model X (251) includes three hidden layers, i.e., hidden layer A (221), hidden layer B (222), and hidden layer C (223). More specifically, the neural network model X (250) obtains the following inputs, i.e., plant steam data X (211), inlet temperature value A (212), steam trap temperature value A (213), steam trap temperature value B (214), steam trap temperature value C (215), and outlet temperature value X (216). Based on the input data, the neural network model X (251) determines a predicted steam trap state Q (290), such as a healthy state, a passing state, a blocked state, or one or more steam trap states in between these states.

While FIGS. 1 and 2 shows various configurations of components, other configurations may be used without departing from the scope of the disclosure. For example, various components in FIGS. 1 and 2 may be combined to create a single component. As another example, the functionality performed by a single component may be performed by two or more components.

Figure 3:
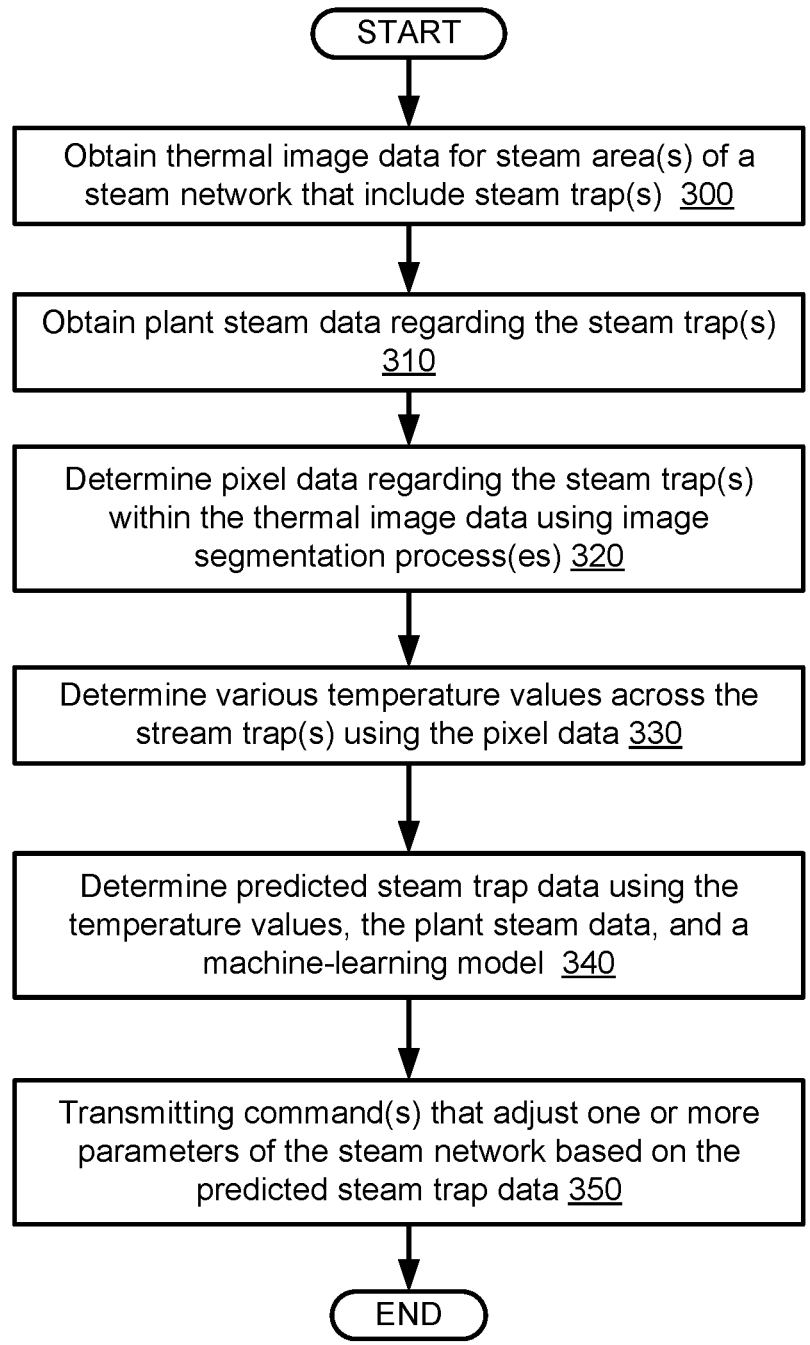
FIG. 3 shows a flowchart in accordance with one or more embodiments.

Turning to FIG. 3, FIG. 3 shows a flowchart in accordance with one or more embodiments. Specifically, FIG. 3 describes a general method for determining predicted steam trap data. One or more blocks in FIG. 3 may be performed by one or more components (e.g., steam trap manager X (110)) as described in FIGS. 1 and 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, thermal image data are obtained for one or more steam areas of a steam network that include one or more steam traps in accordance with one or more embodiments. For example, thermal images may be captured by various camera devices in one or more steam areas. Likewise, thermal images may be obtained during various steam operations, such as an optimal discharge temperature of a steam trap for different steam applications. In some embodiments, a thermal camera device is utilized in capturing images of the stream traps, which are fed continuously to a steam trap manager or other data processing system. For example, thermal images may be used to continuously train a machine-learning model.

Figure 6:
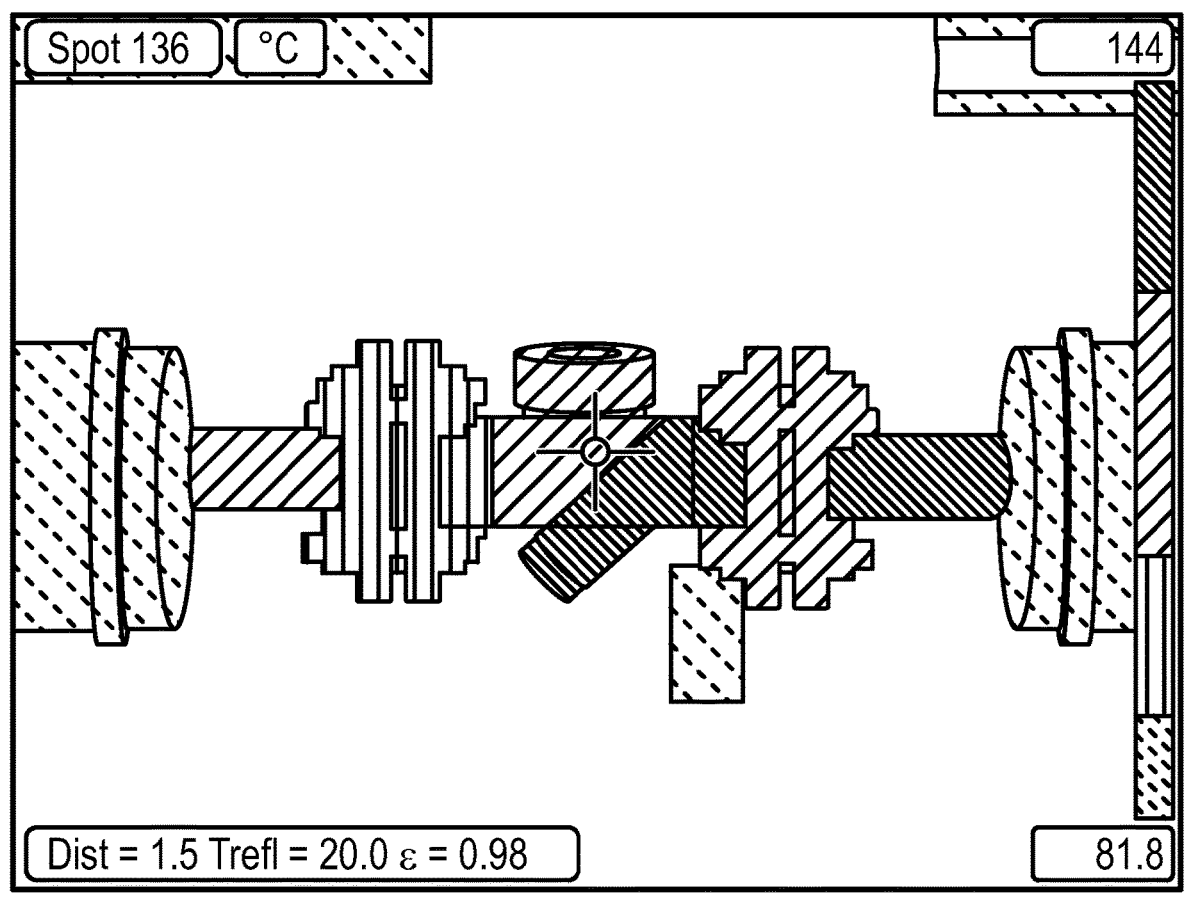
FIG. 6 shows an example in accordance with one or more embodiments.

Turning to FIG. 6, FIG. 6 shows an example thermal image in accordance with one or more embodiments. As shown in FIG. 6, different temperatures are illustrated across a steam trap corresponding to a predetermined color palette.

Returning to FIG. 3, in Block 310, plant steam data are obtained regarding one or more steam traps in accordance with one or more embodiments. In some embodiments, a steam trap manager may collect and aggregate other data for use in determining various steam trap states. For example, plant steam data may include time series data, such as temperature sensor data, flow rate data, and pressure sensor data collected from different sensors throughout a plant facility. Likewise, plant steam data may also include other data types, such as static plant data and historical plant data. For example, static plant data may correspond to a type of steam trap (e.g., data that identifies whether a steam trap is a thermodynamic steam trap or a thermostatic steam trap) as well as other fixed mechanical parameters, such as the physical composition of steam trap components (e.g., steel or copper). Historical plant data may describe past failures of steam traps at the same plant facility as well as different plant facilities, for example.

In Block 320, pixel data are determined regarding one or more steam traps within thermal image data using one or more image segmentation processes in accordance with one or more embodiments. Prior to using thermal image data in a machine-learning model, for example, thermal images may be preprocessed. In some embodiments, an area of interest is identified and isolated within a thermal image, where the area of interest may correspond to one or more regions inside a steam trap. As such, portions of a thermal image may undergo image segmentation, where a respective thermal image is partitioned into multiple segments (e.g., sets of pixels). Thus, image segmentation may determine objects and boundaries (e.g., lines, curves, etc.) in a thermal image to generate pixel data that is more meaningful and easier to analyze by a machine-learning model. Examples of image segmentation processes may include edge detection methods, dual clustering methods, region-growing methods, partial differential equation-based methods, parametric methods, level-set methods, and graph partitioning methods.

In some embodiments, a machine-learning model, such as a U-net model, is used for object recognition and image segmentation within one or more thermal images. More specifically, a U-net model may have a deep neural network architecture that includes functionality for classifying and/or segmenting images. Thus, different chambers, components (such as a disc), and passageways may be identified using machine learning.

In Block 330, various temperature values are determined across one or more steam traps using pixel data in accordance with one or more embodiments. More specifically, a steam trap manager may examine thermal images using the pixel data to determine a temperature distribution across a steam trap. For example, different objects or regions within a steam trap may be labeled with various temperature values (e.g., differential temperature values, absolute temperature values, averaged temperature values for an image pixel object). Thus, a thermal image heat gradient may be translated to temperature values between an inlet and an outlet of a steam trap.

In Block 340, predicted steam trap data are determined using various temperature values, plant steam data, and a machine-learning model in accordance with one or more embodiments. In some embodiments, a steam trap manager may use extracted temperature information from thermal image data, results of a temperature difference analysis, and/or plant steam data for inputs to a machine-learning model. For example, the type of steam trap and a type of steam operation corresponding to thermal image data (e.g., a continuous operation, an intermittent discharge, a supercooled operation, or a saturation temperature discharge) may be inputs to a machine-learning model in addition to temperature values within the steam trap. Likewise, inlet pressure data and outlet pressure data may also be used as inputs to the machine-learning model. In some embodiments, the machine-learning model is a deep neural network, such as a convolutional neural network or a recurrent neural network, with an input layer, an output layer, and various hidden layers.

Based on significant temperature differences between the inlet and the outlet of a steam trap, a steam trap manager may use machine learning to determine whether a steam trap is operating properly or if any components require maintenance or replacement parts. The output of the machine-learning model may be a label or class that identifies a predicted state of the steam trap (e.g., a health state, a passing state, a blocked state, etc.). For example, trap failure states may be caused by drain blockage from dirt buildup, disc and seat deterioration, steam leaks, valve erosion, and damaged internal components. Other failure states may be caused by feed water contamination, the quality of feed water, dissolved gases (e.g., carbon dioxide) that may turn condensate acidic and cause corrosion, and entrainment based on the absence of a strainer or a faulty strainer upstream of the steam trap. In the case of smart steam traps or intelligent steam traps, some embodiments may use machine learning as a secondary technique after sensor readings and local diagnostic measurements to classifying a trap's health condition. Likewise, some embodiments may use machine learning to revalidate sensor reading acquired using a steam energy trap or an intelligent steam trap.

In some embodiments, a steam trap experiences a cold steam trap state (i.e., where the steam trap is stuck closed). In a cold steam trap state, a steam trap is not opening partially or completely, and thus condensate may not discharge. If condensate is not discharging, the steam network may not perform a specific steam application, such as heating plant equipment. Condensate may back up in the steam trap and the transfer of latent heat may stop occurring within the plant network. In some embodiments, a steam trap experiences an excess steam discharge (i.e., where the steam trap is stuck open). In an excess steam discharge state, steam may blow through the steam trap and steam energy is wasted. With the valve open, hot steam may discharge continually. In this state, dirt may have accumulated on a valve seat or a steam trap's bellows has failed. In some cases, a steam trap bellows assembly may need to be replaced or the steam trap may need to be cleaned. In this state, condensate previously heated up and treated may exit the steam network prematurely.

In some embodiments, a steam trap manager presents the status of various steam traps within a graphical user interface on various user devices. For example, a steam trap manager may be a server that provides a centralized dashboard for obtains request for status updates on various steam traps as well as for automating maintenance operations for remedying steam traps in blocked states or steam traps predicted to fail.

In Block 350, one or more commands are transmitted that adjust one or more parameters of a steam network based on predicted steam trap data in accordance with one or more embodiments. In some embodiments, predicted steam trap data is used, e.g., by a steam trap manager, to address any problems in steam operations or potential problems within a steam network. For example, a steam trap manager may reroute steam to different steam traps by opening and closing different valves and pipelines within a steam network to adjust for changing conditions among the steam traps. Likewise, a control system may adjust parameters of steam energy traps or intelligent steam traps using various commands. Likewise, the flow of steam may be adjusted throughout a plant network to alleviate potential issues or delay steam trap issues from impacting plant operations.

Figure 4:
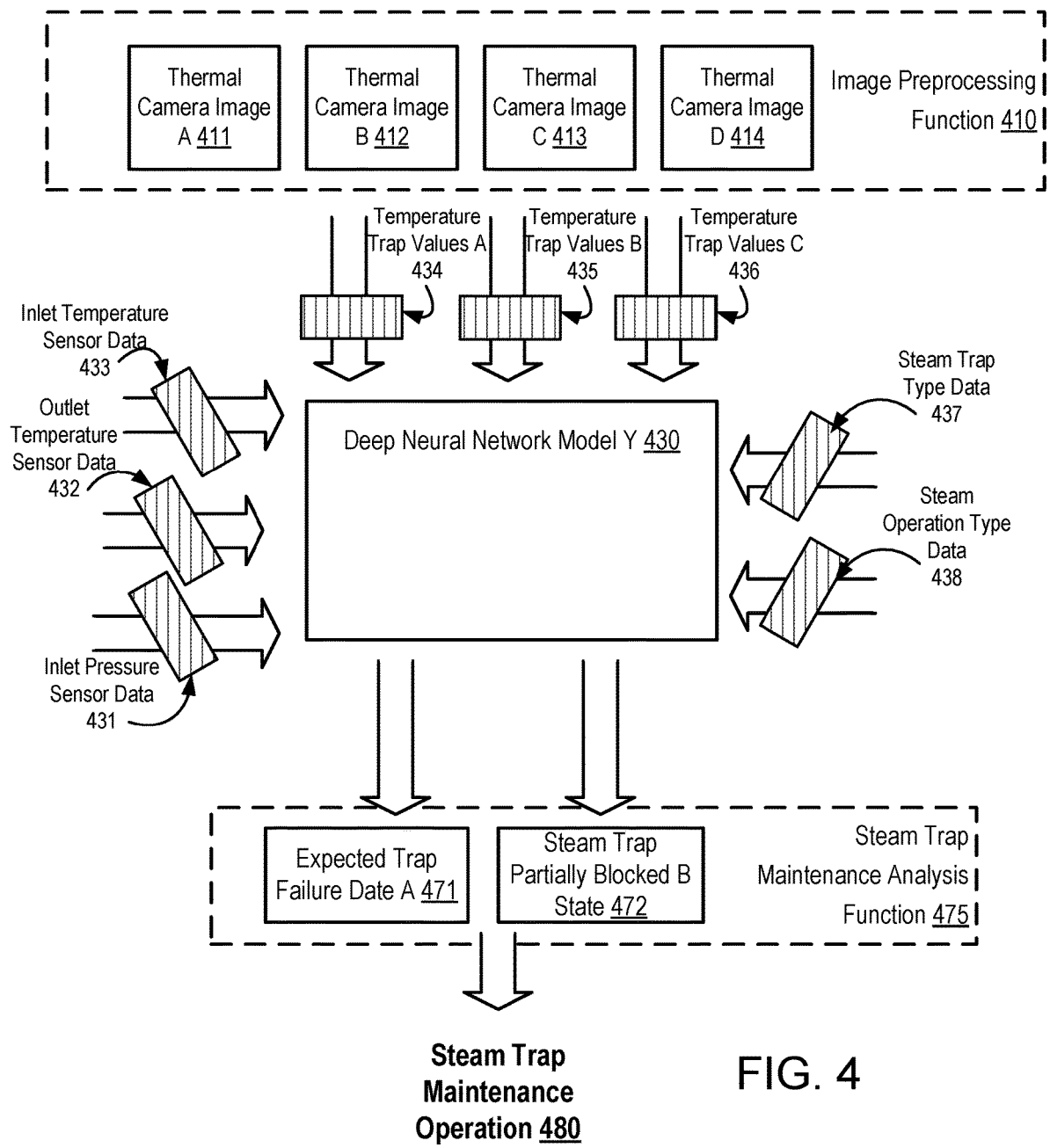
FIG. 4 shows an example in accordance with one or more embodiments.

Turning to FIG. 4, FIG. 4 provides an example of determining a maintenance operation in accordance with one or more embodiments. The following example is for explanatory purposes only and not intended to limit the scope of the disclosed technology. In FIG. 4, a steam trap manager (not shown) obtains multiple camera images of a single steam trap, i.e., thermal camera image A (411), thermal camera image B (412), thermal camera image C (413), and thermal camera image D (414). In particular, the thermal camera images are obtained through a steam operation at the steam trap. The steam trap manager further applies an image preprocessing function (410) that determines various temperature values (i.e., temperature trap values A (434), temperature trap values B (435), and temperature trap values C (436)) for different regions of the steam trap over the complete amount of time that the steam operation is performed. More specifically, the temperature trap values are each a vector of temperature values for a corresponding thermal image.

Keeping with FIG. 4, a deep neural network model Y (430) operated by the steam trap manager obtains various inputs at the model's input layer, i.e., inlet pressure sensor data (431), outlet temperature sensor data (432), inlet temperature sensor data (433), temperature trap values A (434), temperature trap values B (435), temperature trap values C (436), steam trap type data (437) (e.g., whether the steam trap is a mechanical steam trap, a thermodynamic steam trap, or a thermostatic steam trap), and steam operation type data (438) (e.g., a specific type of diagnostic steam operation captured by a camera device). Accordingly, the deep neural network model Y (430) generates an expected trap failure date A (471) of the steam trap and a current steam trap state, i.e., the steam trap partially blocked B state (472). The steam trap manager uses the expected failure date (471) and the steam trap state (472) as inputs to a steam trap maintenance analysis function (475) that determines a steam trap maintenance operation (480) for the steam trap.

Figure 5:
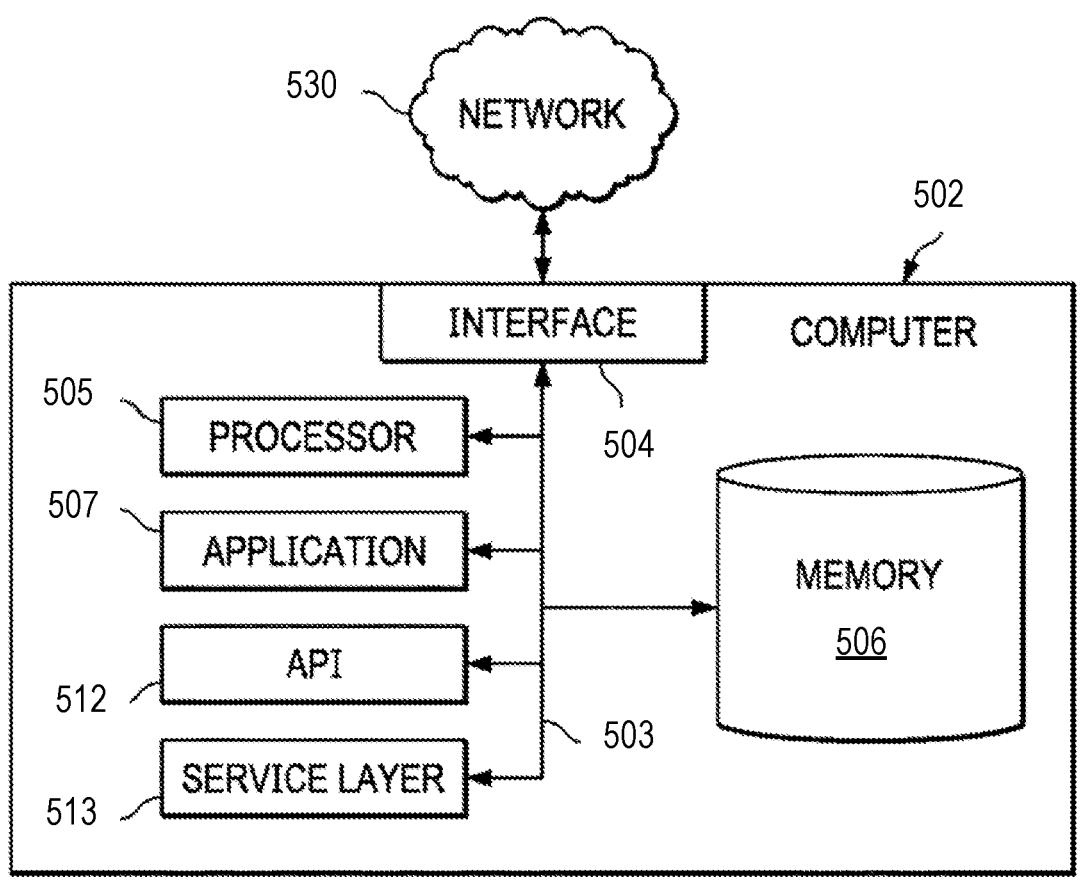
FIG. 5 shows a computer system in accordance with one or more embodiments.

Embodiments may be implemented on a computer system. FIG. 5 is a block diagram of a computer system (502) used to provide computational functionalities associated with described algorithms, methods, functions, processes, flows, and procedures as described in the instant disclosure, according to an implementation. The illustrated computer (502) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504 includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

In some embodiments, the computer (502) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
obtaining, by a steam trap manager comprising a computer processor and a machine-learning model, and from a camera device, thermal image data for a steam area of a plant facility,
wherein the steam area comprises a first steam trap for a steam network,
wherein the first steam trap comprises an inlet and an outlet,
wherein the inlet is coupled to a steam header that is coupled to a steam generator,
wherein the outlet is coupled to a condensate return network that is coupled to the steam generator, and
wherein the camera device is disposed in the steam area;
obtaining, by the steam trap manager, plant steam data regarding the first steam trap;
determining, by the steam trap manager, pixel data regarding the first steam trap using the thermal image data and an image segmentation process;
determining, by the computer processor, a plurality of temperature values across the first steam trap using the pixel data;
determining, by the steam trap manager, first predicted steam trap data using the plurality of temperature values, the plant steam data, and the machine-learning model;
transmitting, by the steam trap manager and over a computer network at the plant facility, a command to a control system in the steam network based on the first predicted steam trap data; and rerouting, by the control system and using one or more valves within the steam network, an amount of steam from the first steam trap to a different steam trap in response to receiving the command.

2. The method of claim 1, further comprising:

determining, by the computer processor and using the machine-learning model, a steam trap state among a plurality of steam trap states of the first steam trap, wherein the command implements a maintenance operation based on the steam trap state.

3. The method of claim 2, wherein the plurality of steam trap states comprise a first state, a second state, and a third state, wherein the first state corresponds to the first steam trap allowing condensate to pass through the first steam trap while trapping a predetermined amount of steam at the inlet of the first steam trap, wherein the second state corresponds to the first steam trap allowing a portion of the predetermined amount of steam to pass through the first steam trap, and wherein the third state corresponds to the first steam trap having no condensate being able to pass through the first steam trap.

4. The method of claim 1, further comprising:

determining, by the computer processor, second predicted steam trap data among a plurality of steam traps using the machine-learning model; and determining, by the computer processor, an expected failure date of the first steam trap among a plurality of steam traps using the second predicted steam trap data.

5. The method of claim 1, further comprising:

determining, by the computer processor, second predicted steam trap data regarding a second steam trap using the machine-learning model; and determining, by the computer processor, whether the second steam trap fails based on the second predicted steam trap data.

6. The method of claim 1, wherein the pixel data is a segmented object within one or more thermal images of the first steam trap.

7. The method of claim 1, wherein the machine-learning model is an artificial neural network comprising a plurality of hidden layers and at least one activation function, a respective hidden layer among the plurality of hidden layers comprising at least one neuron, and wherein the artificial neural network is trained using a backpropagation algorithm.

8. The method of claim 1, wherein the plant steam data is selected from a group consisting of inlet pressure data, outlet temperature data, flow rate data, and inlet temperature data.

9. The method of claim 1, wherein the first steam trap is selected from a group consisting of a passive steam trap, a steam energy trap, and an intelligent steam trap.

10. A system, comprising:

a steam generator;
a steam header coupled to the steam generator;
a condensate return network;
a computer network at a plant facility;
a first steam trap comprising an inlet and an outlet, wherein the inlet of the first steam trap is coupled to the steam header, wherein the outlet is coupled to the condensate return network that is coupled to the steam generator;

a second steam trap that is different from the first steam trap;

a control system coupled to one or more valves within a steam network;

a camera device disposed in a steam area comprising the first steam trap; and a steam trap manager coupled to the camera device, the computer network, and the control system, the steam trap manager comprising a computer processor and a machine-learning model, wherein the steam trap manager is configured to determine a plurality of temperature values across the first steam trap using thermal image data from the camera device, wherein the steam trap manager is further configured to determine predicted steam trap data using the machine-learning model, plant steam data, and the plurality of temperature values, and wherein the steam trap manager is further configured to transmit over the computer network at the plant facility a command to the control system based on the predicted steam trap data, and wherein the control system is configured to reroute an amount of steam from the first steam trap to the second steam trap using the one or more valves in response to receiving the command.

11. The system of claim 10, wherein the steam trap manager further comprises functionality for:

determining, using the machine-learning model, a steam trap state among a plurality of steam trap states of the first steam trap; and transmitting a command to a control system that implements a maintenance operation based on the steam trap state.

12. The system of claim 11, wherein the plurality of steam trap states comprise a first state, a second state, and a third state, wherein the first state corresponds to the first steam trap allowing condensate to pass through the first steam trap while trapping a predetermined amount of steam at an inlet of the first steam trap, wherein the second state corresponds to the first steam trap allowing a portion of the predetermined amount of steam to pass through the first steam trap, and wherein the third state corresponds to the first steam trap having no condensate being able to pass through the first steam trap.

13. The system of claim 10, further comprising:

a condensate return network coupled to the outlet of the first steam trap, wherein the steam generator is a boiler, and wherein the predicted steam trap data describes a flow of condensate to the condensate return network from the first steam trap.

14. The system of claim 10, where the steam trap manager further comprises functionality for:

determining, by the computer processor, pixel data regarding the first steam trap using the thermal image data and an image segmentation process, wherein the pixel data is a segmented object within one or more thermal images of the first steam trap.

15. The system of claim 10,
wherein the plant steam data is selected from a group consisting of inlet pressure data, outlet temperature data, flow rate data, and inlet temperature data.

16. The system of claim 10,
wherein the first steam trap is selected from a group consisting of a passive steam trap, a steam energy trap, and an intelligent energy trap.

17. The system of claim 10,
wherein the machine-learning model is an artificial neural network comprising a plurality of hidden layers and at least one activation function, a respective hidden layer among the plurality of hidden layers comprising at least one neuron, and
wherein the artificial neural network is trained using a backpropagation algorithm.

18. A non-transitory computer readable medium storing instructions executable by a computer processor, the instructions comprising functionality for:
obtaining, from a camera device, thermal image data for a steam area of a plant facility,
wherein the steam area comprises a steam trap for a steam network,
wherein the steam trap comprises an inlet and an outlet,
wherein the inlet is coupled to a steam header that is coupled to a steam generator,
wherein the outlet is coupled to a condensate return network that is coupled to the steam generator, and
wherein the camera device is disposed in the steam area;
obtaining plant steam data regarding the steam trap;
determining pixel data regarding the steam trap using the thermal image data;
determining a plurality of temperature values across the steam trap using the pixel data;
determining first predicted steam trap data using the plurality of temperature values, the plant steam data, and a machine-learning model; and
transmitting a command to a control system in the steam network based on the first predicted steam trap data
wherein the control system reroutes an amount of steam from a steam trap to a different steam trap using one or more valves within the steam network in response to receiving the command.

19. The non-transitory computer readable medium of claim 18, wherein the instructions further comprise functionality for:
determining, using the machine-learning model, a steam trap state among a plurality of steam trap states of the steam trap,
wherein the command implements a maintenance operation based on the steam trap state.

* * * * *